(12) United States Patent
Reim et al.

(10) Patent No.: US 11,021,096 B2
(45) Date of Patent: Jun. 1, 2021

(54) METHOD FOR ILLUMINATING A ROAD AREA BY PROJECTING A TRAJECTORY, AND MOTOR VEHICLE

(71) Applicant: AUDI AG, Ingolstadt (DE)

(72) Inventors: Johannes Reim, Eichstätt (DE); Said Omerbegovic, Frankfurt am Main (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/771,850

(22) PCT Filed: Dec. 11, 2018

(86) PCT No.: PCT/EP2018/084400
§ 371 (c)(1),
(2) Date: Jun. 11, 2020

(87) PCT Pub. No.: WO2019/121175
PCT Pub. Date: Jun. 27, 2019

(65) Prior Publication Data
US 2021/0107394 A1 Apr. 15, 2021

(30) Foreign Application Priority Data
Dec. 20, 2017 (DE) .................... 10 2017 223 451.2

(51) Int. Cl.
*B60Q 1/08* (2006.01)
*B60Q 1/12* (2006.01)

(52) U.S. Cl.
CPC ............... *B60Q 1/085* (2013.01); *B60Q 1/12* (2013.01); *B60Q 2300/112* (2013.01); *B60Q 2300/114* (2013.01)

(58) Field of Classification Search
CPC ........ B60Q 2300/112; B60Q 2300/114; B60Q 1/08; B60Q 1/085
See application file for complete search history.

(56) References Cited

U.S. PATENT DOCUMENTS

| 7,415,338 B2 * | 8/2008 | Monji .................... B60Q 1/085 |
| | | 250/208.4 |
| 2013/0054089 A1 | 2/2013 | Nordbruch et al. |

FOREIGN PATENT DOCUMENTS

| DE | 10240227 A1 | 3/2004 |
| DE | 102011081394 B3 | 10/2012 |

(Continued)

OTHER PUBLICATIONS

International Preliminary Report on Patentability directed to related International Patent Application No. PCT/EP2018/084400, completed Nov. 19, 2019, with attached English-language translation; 10 pages.

(Continued)

*Primary Examiner* — Robert J May
(74) *Attorney, Agent, or Firm* — Sterne, Kessler, Goldstein & Fox P.L.L.C.

(57) ABSTRACT

The disclosure relates to a method for illuminating a road area by a motor vehicle having the following steps: determining a trajectory relating to a future movement of the motor vehicle on a road, calculating a light distribution for a headlamp of the motor vehicle as a function of the determined trajectory in such a manner that a course of the trajectory is projected onto the road as part of the light distribution, and emitting a brightness distribution corresponding to the light distribution by the headlamp onto the road. In order to facilitate an improved overview of the driving of the motor vehicle, the light distribution is additionally calculated as a function of the determined trajectory in such a manner that, based on the light distribution in addition to the trajectory, an acceleration of the motor vehicle parallel to its longitudinal direction is also symbolized.

9 Claims, 1 Drawing Sheet

(56) References Cited

FOREIGN PATENT DOCUMENTS

| | | |
|---|---|---|
| DE | 102012025354 A1 | 7/2014 |
| DE | 102013100200 A1 | 7/2014 |
| DE | 102014226254 A1 | 6/2016 |
| DE | 102015201764 A1 | 8/2016 |
| DE | 102016113913 A1 | 2/2018 |
| EP | 1334871 A2 | 8/2003 |
| EP | 3401162 A1 | 11/2018 |
| GB | 2517790 A | 3/2015 |
| JP | 2016101797 A | 6/2016 |
| JP | 2017144995 A | 8/2017 |

OTHER PUBLICATIONS

International Search Report and Witten Opinion of the International Searching Authority directed to related International Patent Application No. PCT/EP2018/084400, completed Mar. 22, 2019, with attached English-language translation; 19 pages.

\* cited by examiner

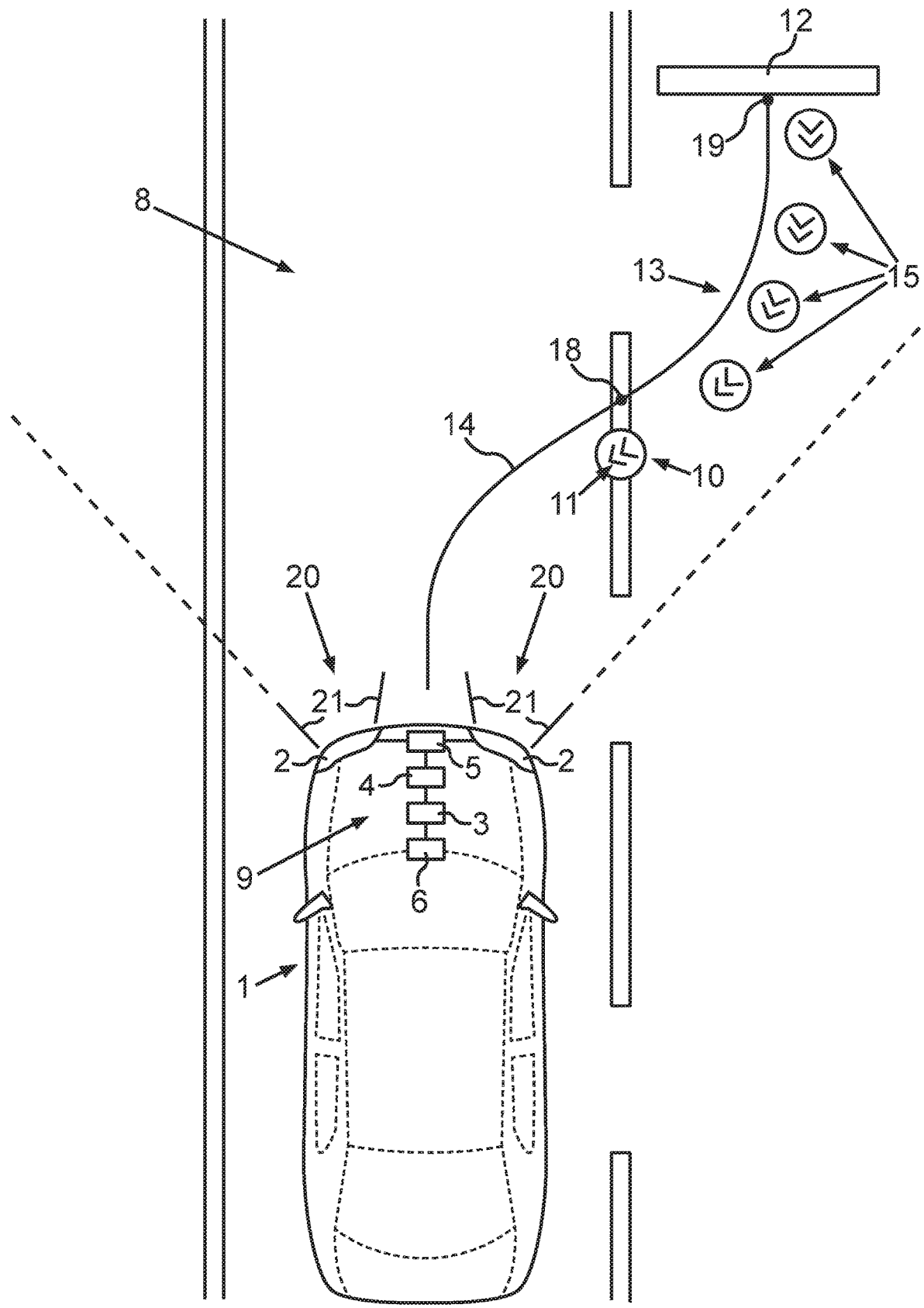

METHOD FOR ILLUMINATING A ROAD AREA BY PROJECTING A TRAJECTORY, AND MOTOR VEHICLE

TECHNICAL FIELD

The disclosure relates to a method for illuminating a road area by a motor vehicle. A trajectory, which relates to a future movement of the motor vehicle on a road, is projected onto the road. A second aspect of the disclosure relates to a motor vehicle having an illumination apparatus.

BACKGROUND

From the prior art, high-resolution headlamps are known, which in particular can resolve at least 200, 500, 1000 or 2000 pixels. Such high-resolution headlamps can be used for the projection of images and symbols onto the road. Such a high-resolution headlamp may, for example, have a matrix lighting, an assembly of micromirrors, an assembly of liquid crystals or a laser scanner.

In a mixed operation of partially or fully autonomously operated vehicles with vehicles controlled by a driver, a high risk potential exists due to unrecognized driving maneuvers. In particular, human drivers can often assess the behavior of autonomously controlled vehicles with difficulty.

In this context, DE 10 2014 226 254 A1 reveals a method for operating a signaling device of an autonomously or partially autonomously driving motor vehicle, wherein the signaling device is actuated as a function of a detected traffic participant to indicate an information about a further behavior of the motor vehicle and/or the detected traffic participant. At least one signaling means of the signaling device may be arranged on a headlamp of the motor vehicle.

DE 10 2011 081 394 B3 relates to a method for highlighting an expected movement path of a vehicle, wherein the method comprises a step of determining a traffic situation using an information about an environment of the vehicle. Based on the detected traffic situation, an expected movement path is highlighted by a road marking device. For example, a headlamp of the vehicle can be actuated as the road marking device.

DE 10 2012 025 354 A1 relates to a device and a method for indicating a change of a dynamic parameter of a means of transport. For indication, a predefined irregularity is projected onto a surface in the surrounding of the means of transport. The predefined irregularity is projected onto the surface by a lighting, for example a front headlamp.

BRIEF DESCRIPTION OF THE DRAWINGS

FIG. 1 shows a motor vehicle having an illumination apparatus for illuminating a road area of a road, according to some embodiments of the present disclosure.

DETAILED DESCRIPTION

The disclosure relates to the object of providing an improved overview of the driving of a motor vehicle, especially for further traffic participants.

This object is solved according to the disclosure by the subject matter of the independent patent claims. Advantageous embodiments with expedient developments are the subject matter of the sub-claims.

The disclosure relates to a method for illuminating a road area by a motor vehicle with the following steps: Determining a trajectory relating to a future movement of the motor vehicle on a road, calculating a light distribution for a headlamp of the motor vehicle as a function of the determined trajectory in such a manner that a course of the trajectory is projected onto the road as part of the light distribution, and emitting a brightness distribution corresponding to the light distribution onto the road by means of the headlamp. In some embodiments of the disclosure, the trajectory can be determined based on a traffic situation in which the motor vehicle is located. For example, the traffic situation can be detected with an environment sensor of the motor vehicle, which for example comprises a radar sensor, a Lidar sensor, a camera and/or an ultrasonic sensor. Alternatively or additionally, control instructions of the driver or a control apparatus for an autonomous operation of the vehicle can be detected for determining the trajectory. The future movement of the motor vehicle on the road can be specified by the control instructions. For example, the control instructions continuously actuate a steering apparatus, a braking apparatus and an acceleration apparatus of the vehicle. In other words, it can be deduced from the control instructions which steering maneuvers, braking maneuvers and acceleration maneuvers the motor vehicle will perform during the future movement on the road. Thereby the future movement of the motor vehicle relates in particular to a movement of the motor vehicle for at least five, ten, 20 or 50 meters. In other words, the future movement is advantageously not only extrapolated from a momentary acceleration, steering or deceleration of the motor vehicle, but calculated in advance.

In order to facilitate an improved overview of the movement of the motor vehicle, it is foreseen that the light distribution is additionally calculated as a function of the determined trajectory in such a manner that based on the light distribution in addition to the trajectory, also an acceleration of the motor vehicle is symbolized parallel to its longitudinal direction. In other words, both the course of the trajectory and a change in velocity of the motor vehicle are symbolized by the light distribution. By projecting the light distribution onto the road, both the course of the trajectory and the change in velocity of the motor vehicle are thus displayed by the projection on the road.

Acceleration of the motor vehicle parallel to its longitudinal direction is understood to be both positive acceleration (speed up) and negative acceleration (braking). Thus, acceleration of the motor vehicle parallel to its longitudinal direction is understood to be both an increase and a decrease in velocity.

For example, the acceleration of the motor vehicle parallel to its longitudinal direction is represented by a symbol which is projected onto the road as part of the light distribution. In particular, a symbol can be predefined for this purpose, which is particularly intuitively understandable for drivers of further motor vehicles. The symbol may preferably represent in which direction the acceleration of the motor vehicle is directed parallel to its longitudinal direction and/or the intensity of this acceleration. For example, the symbol can represent whether the vehicle is speeding up or braking. In this manner, the acceleration of the motor vehicle parallel to its longitudinal direction can be symbolized in a particularly intuitively understandable manner.

The course of the trajectory can be represented by a line which resembles the course of the trajectory and is projected onto the road as part of the light distribution. Thereby, the line can have the course that the motor vehicle will follow in a future movement. By representing the trajectory by means of a line, the future movement of the motor vehicle can be visualized in a particularly intuitive and understandable manner.

In an embodiment of the disclosure, the light distribution is calculated in such a manner that the symbol next to the line is projected onto the road. In other words, in the projection of the brightness distribution corresponding to the light distribution onto the road, the symbol representing the change in velocity or acceleration of the motor vehicle is shown next to the line representing the course of the trajectory. In this manner, an even more intuitively understandable representation of the future movement of the motor vehicle is possible.

A further development stipulates that the acceleration of the motor vehicle parallel to its longitudinal direction is represented by at least one arrow, which is directed corresponding to a direction of the acceleration and is projected onto the road as part of the light distribution. In other words, a change in velocity of the motor vehicle is represented by the at least one arrow, which is directed corresponding to the direction of the change in velocity. In particular, the at least one arrow is directed in the driving direction to represent a future acceleration of the motor vehicle and is directed against the driving direction to represent a future braking of the motor vehicle. The at least one arrow can be part of the symbol above. For example, the symbol consists partly or exclusively of the at least one arrow. The acceleration of the motor vehicle parallel to its longitudinal direction can be made particularly intuitively recognizable by the arrow.

The at least one arrow/symbol is preferably projected at that point in the course of the trajectory where the motor vehicle will experience the acceleration along the longitudinal direction. In this manner, the symbol/the at least one arrow can show not only that the vehicle is accelerating parallel to its longitudinal axis, but also at what point.

A further development stipulates that a future stopping of the motor vehicle is represented by a line, in particular a stop line, which is directed orthogonally to the trajectory and is projected onto the road as part of the light distribution. Future stopping of the motor vehicle means, in particular, that the motor vehicle brakes to a standstill during its future movement. In this case, the trajectory may end in a stop point where the vehicle comes to a rest. In this case the further line, especially the stop line, can run orthogonally to the trajectory through this stop point. In general, the further line, in particular the stop line, can be shown in this position, in which the motor vehicle will come to a rest during future stopping. In this manner, it can be shown to other traffic participants that the motor vehicle will stop in the future.

When determining the trajectory, it can, for example, be received from a driver assistance system for controlling an autonomous drive. Such a driver assistance system usually continuously calculates a trajectory to control such autonomous driving. In this case the trajectory can be calculated by the driver assistance system. This has the advantage that it can be made clear to other traffic participants in which manner the vehicle will be moved autonomously in the future.

Further development stipulates that the acceleration of the motor vehicle parallel to its longitudinal direction is represented along the trajectory through an animation of a temporally variable brightness distribution, which is projected onto the road corresponding to the light distribution. For example, a light source is displayed on the road by means of the temporally variable brightness distribution. The animation of the temporally variable brightness distribution can have a movement direction. In the example of the light source as the animation, a direction of a group velocity and/or phase velocity of the light source can correspond to the movement direction. A further particularly intuitive possibility for displaying the acceleration of the vehicle parallel to its longitudinal direction results from the temporally variable brightness distribution.

Further development stipulates that a brightness of the light distribution along the course of the trajectory increases if a velocity of the motor vehicle along the course of the trajectory will increase in the future and decreases if the velocity of the motor vehicle along the course of the trajectory will decrease in the future. In other words, the brightness of the light distribution increases when the motor vehicle is speeding up in future and decreases when the motor vehicle brakes in future. For example, the brightness of the light distribution can be reduced locally along the course of the trajectory relative to a basic value if the velocity of the motor vehicle will decrease in the future and be raised if the velocity of the motor vehicle will increase in the future. Thereby, the brightness of the light distribution is adapted at the point along the course of the trajectory in which the change in velocity will be made. Thus, not only is it shown that the velocity of the motor vehicle will change, but also at which point the velocity of the motor vehicle will change.

The disclosure also encompasses a motor vehicle having an illumination apparatus for illuminating a road area with a determination unit for determining a trajectory which relates to a future movement of the motor vehicle on a road, a calculation unit for calculating a light distribution for a headlamp of the motor vehicle as a function of the determined trajectory in such a manner that a course of the trajectory is projected onto the road as part of the light distribution, and a control unit for actuating the headlamp in such a manner that it emits a brightness distribution corresponding to the light distribution. According to the disclosure, the calculation unit is designed to additionally calculate the light distribution as a function of the determined trajectory in such a manner that an acceleration of the motor vehicle parallel to its longitudinal direction is also symbolized based on the light distribution additionally to the trajectory.

The headlamp is preferably executed as a high-resolution headlamp. The headlamp may, for example, have a matrix lighting, an assembly of micromirrors, an assembly of liquid crystals or a laser scanner.

The motor vehicle is in particular a motor car, for example a passenger car or a lorry. The motor vehicle may have an internal combustion engine and/or an electric engine for propulsion. In particular, the motor vehicle is configured to perform a fully or partially autonomous drive. For this purpose, the motor vehicle may have a driver assistance system to control an autonomous drive of the vehicle. In particular, the determination unit is designed to receive the trajectory from the driver assistance system.

The disclosure also includes the combinations of the described embodiments.

The disclosure also includes further embodiments of the motor vehicle according to the disclosure, which have features such as those previously described in connection with the further embodiments of the method according to the disclosure. For this reason, the corresponding embodiments of the motor vehicle according to the disclosure are not described again here.

Exemplary embodiments of the disclosure are described below. For this purpose, FIG. 1 shows in a schematic aerial view a motor vehicle, whose future movement is projected onto a road.

The exemplary embodiments explained below are preferred embodiments of the disclosure. In the exemplary embodiments, the components of the embodiments that are described each constitute individual features of the disclosure to be considered independently of each other, which individually also further develop the disclosure independently of each other and are thus also to be considered part of the disclosure both individually and in a combination that is different from the combination described. In addition, the embodiments described can also be supplemented by further features of the disclosure, which have already been described.

In the drawings, functionally identical elements are each denoted with the same reference signs.

FIG. 1 shows a motor vehicle 1 having an illumination apparatus 9 for illuminating a road area of a road 8. The illumination apparatus 9 comprises two headlamps 2 emitting a brightness distribution 20 in a respective emission area 21. Furthermore, the illumination apparatus 9 presently comprises a determination unit 3, a calculation unit 4 and a control unit 5. The control unit 5 is designed to control the brightness distribution 20 of the headlamps 2.

The determination unit 3 determines a trajectory which relates to a future movement of the motor vehicle 1 on the road 8. In particular, the trajectory clearly specifies the future movement of the motor vehicle 1 on the road 8 for a route of at least five meters, ten meters, 20 meters, 50 meters or 100 meters. Through the trajectory, a sequence of steering maneuvers and acceleration maneuvers can be specified for the motor vehicle 1. For example, the trajectory can be determined from a traffic situation on the road 8 and/or based on the control instructions of a driver of the motor vehicle 1. The present vehicle 1 is, however, designed for performing an autonomous drive. During the autonomous drive, the motor vehicle 1 can control itself without the driver of the motor vehicle 1 engaging. In this case, for example, the motor vehicle 1 has no driver, but only occupants. Alternatively, the motor vehicle 1 could also be empty. For controlling the autonomous drive, the motor vehicle 1 has a driver assistance system 6. The driver assistance system 6 is designed to control the autonomous drive of the motor vehicle 1. For controlling the autonomous drive, the trajectory relating to the future movement of the motor vehicle 1 on the road 8 is calculated by the driver assistance system 6. This trajectory is received by the determination unit 3 from the driver assistance system 6.

Based on the trajectory, the calculation unit 4 calculates a respective light distribution for each of the headlamps 2 of the motor vehicle 1. Thereby, the respective light distribution is calculated in such a manner that a course 13 of the trajectory is projected onto the road 8 as part of the light distribution. According to FIG. 1, the trajectory is represented by a line 14. In other words, the motor vehicle 1 drives along the line 14 in the present example during its autonomous drive.

The headlamps 2 are executed as high-resolution headlamps. The headlamps 2 may, for example, each have a matrix lighting, an arrangement of micromirrors, an arrangement of liquid crystals or a laser scanner.

In the present example, the motor vehicle 1 will move along the line 14 at constant velocity according to the determined trajectory up to the point 18. From the point 18, the motor vehicle 1 will reduce its velocity, that is, it will brake and thus continue to follow line 14 with reduced velocity. Due to the braking maneuver, it is planned that the motor vehicle 1 will come to a rest at a point 19. The two points 18, 19 characterize in general a portion of the trajectory in which an acceleration of the motor vehicle 1 parallel to its longitudinal direction is planned. In other words, the point 18 characterizes a point where an acceleration maneuver is started and the point 19 characterizes a point where the acceleration maneuver is finished. As already explained, the term "acceleration maneuver" refers to both braking and speeding up.

The calculation unit 4 calculates the light distribution for the headlamps 2 in such a manner that the line 14 as well as a symbol 10 and a stop line 12 are projected onto the road 8 as part of the light distribution. In other words, the calculation unit calculates which brightness distribution 20 is to be emitted by the headlamps 2, in order to display the line 14, the symbol 10 as well as the stop line 12 on the road 8. Thus, the light distribution is a calculation variable which is calculated in order to control the headlamps 2. The control unit 5 controls the headlamps 2 based on this calculated light distribution in such a manner that each of the headlamps 2 emits a brightness distribution 20 corresponding to the respective light distribution.

Thus, with the brightness distribution 20, the symbol 10, the line 14 and the stop line 12 are displayed on the road 8.

The symbol 10 comprises at least one arrow 11, in the present case two arrows 11. The at least one arrow 11 may be directed parallel to the longitudinal direction of the motor vehicle 1 corresponding to its vector of an acceleration. The acceleration of the motor vehicle 1 parallel to its longitudinal direction can be induced for example by braking or speeding up. In other words, either the velocity of the motor vehicle 1 can be raised or reduced. In the present case, the velocity of the motor vehicle 1 is reduced from the point 18. Therefore, the at least one arrow 11 present is directed against the course 13 of the trajectory. In another example, in which the motor vehicle 1 raises its velocity, the at least one arrow 11 can be directed corresponding to the course 13 of the trajectory.

It is advantageous that the symbol 10 or the at least one arrow 11 is arranged where the motor vehicle 1 will start the velocity change or acceleration parallel to the driving direction. Alternatively or additionally, further symbols 15 can be displayed over the part of the course 13 of the trajectory over which the acceleration parallel to the driving direction is stipulated. These further symbols 15 can resemble the symbol 10, for example. In the present case, however, the symbols 15 are smaller than the symbol 10. In the present case, the further symbols 15 are displayed along the course 13 of the trajectory between the points 18 and 19, since the braking maneuver is stipulated between these two points 18, 19.

The fact that the motor vehicle 1 is expected to come to a rest at the point 19 is represented by the stop line 12. The stop line 12 is directed orthogonal to the course 13 of the trajectory in the point 19. By displaying the stop line 12, it can be displayed to other traffic participants that the vehicle 1 is expected to come to a rest at the point 19.

In further embodiments of the disclosure not shown in FIG. 1, it may be stipulated that instead of the symbol 10, the arrows 11 and/or the further symbols 15 either a temporally variable brightness distribution is displayed between the points 18 and 19 or that a brightness of the brightness distribution 20 is raised or reduced along the course 13 of the trajectory between the points 18 and 19.

For example, a brightness of the light distribution in an area locally around the course 13 represents a velocity of the motor vehicle 1, which is stipulated in the respective point. A rise in the velocity can be represented in this case by a brightness distribution 20 becoming brighter along the course 13. A reduction in the velocity can be represented by the brightness distribution becoming darker along the course 13.

Altogether, the execution examples show how an improved overview of a future movement of a motor vehicle can be made possible, especially for other traffic participants.

The invention claimed is:

1. A method for illuminating a road area by a motor vehicle, comprising:
    determining a trajectory relating to a future movement of the motor vehicle on a road;
    calculating a light distribution for a headlamp of the motor vehicle as a function of the determined trajectory, comprising:
        calculating the light distribution to symbolize an acceleration of the motor vehicle parallel to a longitudinal direction of the motor vehicle;
    projecting a course of the trajectory onto the road as part of the light distribution; and
    emitting, by the headlamp, a brightness distribution corresponding to the light distribution onto the road, wherein
        the brightness distribution of the light distribution along the course of the trajectory increases when a velocity of the motor vehicle along the course of the trajectory increases in the future movement, and decreases when the velocity of the motor vehicle along the course of the trajectory decreases in the future movement.

2. The method according to claim 1, wherein the projecting the course of the trajectory comprises:
    projecting, onto the road as part of the light distribution, a line that represents the course of the trajectory.

3. The method according to claim 1, further comprising:
    projecting, onto the road as part of the light distribution, a symbol that represents the acceleration of the motor vehicle parallel to the longitudinal direction.

4. The method according to claim 3, wherein the projecting the symbol comprises:
    projecting the symbol next to a line that represents the course of the trajectory.

5. The method according to claim 1, further comprising:
    representing the acceleration by at least one arrow directed to a direction of the acceleration; and
    projecting the at least one arrow onto the road as part of the light distribution.

6. The method according to claim 1, further comprising:
    representing a future stopping of the motor vehicle by a stop line that is directed orthogonally to the course of the trajectory; and
    projecting the stop line onto the road as part of the light distribution.

7. The method according to claim 1, wherein the determining the trajectory comprises:
    receiving the trajectory from a driver assistance system for controlling an autonomous drive.

8. The method according to claim 1, further comprising:
    representing the acceleration along the trajectory by an animation of a temporally variable brightness distribution; and
    projecting the animation of the temporally variable brightness distribution onto the road.

9. A motor vehicle having an illumination apparatus for illuminating a road area, comprising:
    a determination unit configured to determine a trajectory relating to a future movement of the motor vehicle on a road;
    a calculation unit configured to:
        calculate a light distribution for a headlamp of the motor vehicle as a function of the determined trajectory to project a course of the trajectory onto the road as part of the light distribution; and
        calculate the light distribution to symbolize an acceleration of the motor vehicle parallel to a longitudinal direction of the motor vehicle; and
    a control unit configured to actuate the headlamp to emit a brightness distribution corresponding to the light distribution, wherein
        the motor vehicle is configured to display the light distribution such that the brightness distribution along the course of the trajectory increases when a velocity of the motor vehicle along the course of the trajectory increases in the future movement, and decreases when the velocity of the motor vehicle along the course of the trajectory decreases in the future movement.

* * * * *